(12) United States Patent
Huber

(10) Patent No.: US 6,702,047 B2
(45) Date of Patent: Mar. 9, 2004

(54) DRILL BIT FOR DRILLING ROCK

(75) Inventor: Ronald Huber, Vils (AT)

(73) Assignee: Ceratizit Austria Gesellschaft m.b.H., Reutte (AT)

( * ) Notice: Subject to any disclaimer, the term of this patent is extended or adjusted under 35 U.S.C. 154(b) by 0 days.

(21) Appl. No.: 10/179,482

(22) Filed: Jun. 25, 2002

(65) Prior Publication Data

US 2003/0000745 A1 Jan. 2, 2003

(30) Foreign Application Priority Data

Jul. 2, 2001 (AT) ......................................... 521/2001 U

(51) Int. Cl.⁷ ............................................... E21B 10/40
(52) U.S. Cl. ..................................... 175/427; 175/435
(58) Field of Search ............................. 175/427, 435, 175/323; 76/108.2, 108.6

(56) References Cited

U.S. PATENT DOCUMENTS 6,514,019 B1 * 2/2003 Schulz ........................ 408/59
6,588,520 B2 * 7/2003 Hauptmann ................ 175/430
2002/0172569 A1 * 11/2002 Nakamura ................ 408/144

FOREIGN PATENT DOCUMENTS

| AT | 004 252 U1 | 4/2001 |
| DE | 199 44 406 A1 | 5/2001 |
| GB | 2 201 910 A1 | 9/1988 |
| WO | WO 00/25967 | 5/2000 |

* cited by examiner

*Primary Examiner*—William Neuder
(74) *Attorney, Agent, or Firm*—Laurence A. Greenberg; Werner H. Stemer; Ralph E. Locher

(57) ABSTRACT

The drill bit is particularly suitable for drilling rock. An elongated shank carries at least one cutting insert at one end. Cutting edges are formed by adjoining flanks and rake faces which enclose a wedge angle γ. The rake faces, between marginal segments at the circumference of the drill bit and segments at the center of the drill bit have one or more recesses which run right into the adjacent flanks. These recesses reduce the wedge angle γ, at least in a longitudinal section extending directly up to the cutting edges, relative to the remaining cutting-edge segments. In this way, an improved drilling capacity with good resistance to chipping of the cutting edges is achieved.

11 Claims, 2 Drawing Sheets

DRILL BIT FOR DRILLING ROCK

BACKGROUND OF THE INVENTION

Field of the Invention

The invention relates to a drill bit, in particular a bit for drilling rock, comprising an elongated shank and at least one cutting insert at one end, this cutting insert having at least one front-end cutting edge running from the circumference to the rotary axis of the drill bit. The cutting edge is formed by virtue of the fact that a rake face, lying in front of the cutting edge in the direction of rotation of the drill bit, and a flank, lying behind the cutting edge in the direction of rotation of the drill bit, adjoin one another, and the rake face and the flank enclose a wedge angle γ with one another.

Drill bits for drilling rock generally consist of a cylindrical steel shank with helically twisted flutes for removing the drillings, with a clamping end to be accommodated in the drilling machine and with a drill bit head at the other end. The drill bit head being formed by one or more cutting inserts connected to the steel shank as a rule by brazing and made of a wear-resistant material, such as cemented carbide.

The cutting inserts, due to the rotary movement of the drill bit and as a rule due to an additional axial hammer movement superimposed on the rotary movement, are subjected to abrasion stress on the one hand and to percussion stress on the other hand.

The requirement for such drill bits, in addition to as long a service life as possible, is to also achieve as good a drilling capacity as possible (drilling advance per unit of time).

The most common, conventional drill bits for drilling rock have as drill bit head, a cutting insert with two front-end cutting edges which adjoin one another in a roof shape and which have a uniform wedge angle along its profile from the circumference to the center of the drill bit, this wedge angle as a rule lying within a range of 80° to 100°. Although this relatively large wedge angle results in high stability and resistance to chipping of the cutting edge, the chiseling action, achieved in particular by the hammer movement of the drill bit, and thus the drilling advance per unit of time, that is to say the drilling capacity, are not optimal.

The pertinent art, therefore, does not lack a showing of prior attempts to also increase in particular the drilling capacity. Thus, by way of example, Austrian Utility Model 4.252 describes a drill bit for drilling rock having a cutting insert wherein the clearance angle β of the cutting edge increases with increasing distance from the rotary axis D and the wedge angle γ correspondingly decreases.

An improvement in the drilling capacity is certainly achieved by such a design. However, the smallest wedge angle γ at the outer circumference of the cutting insert must not become too small in order to avoid chipping of the cutting edges at this point, so that the drilling capacity is still not optimal even in such a drill bit.

German published patent application DE 199 44 406 A1 describes a rock drill bit wherein the flank extends into the cutting insert in a manner differing from a flat profile or is concave.

In this way, the wedge angle γ is certainly reduced and thus the drilling capacity improved. However, if the entire flank is designed in such a way, chipping of the cutting edges may occur, in particular at the marginal section of the cutting edge. In order to prevent this, is it advantageous according to this pre-publication to provide that region of the flank which directly adjoins the cutting edge with a protective chamfer having a comparatively larger wedge angle, which makes the drilling capacity slightly worse again. In addition, a high frictional stress with the material to be removed occurs in such a drill bit due to the flat rake face, a factor which again causes premature wear of the cutting insert. Furthermore, the cutting capacity when cutting steel, which is of importance in particular when drilling through reinforcements in concrete, is poor.

SUMMARY OF THE INVENTION

It is accordingly an object of the invention to provide a drill bit for drilling rock, which overcomes the above-mentioned disadvantages of the heretofore-known devices of this general type and which has a good drilling capacity, with good resistance to chipping of the cutting edges, and good wear resistance. In addition, the cutting of iron materials is also to be readily possible.

With the foregoing and other objects in view there is provided, in accordance with the invention, a drill bit, in particular for drilling rock, comprising:

an elongated shank defining a rotary axis D of the drill bit and having at least one cutting insert at an end thereof;

the cutting insert having at least one front-end cutting edge extending from a periphery to the rotary axis D of the drill bit, the cutting edge being formed by a rake face, lying ahead of the cutting edge in a direction of rotation of the drill bit, and a flank, lying behind the cutting edge in the direction of rotation of the drill bit, the rake face and the flank face adjoining one another and enclosing a wedge angle γ with one another;

the rake face having formed therein at least one recess between a marginal segment at the periphery of the drill bit and a center segment at a center of the drill bit, the recess running into the adjacent the flank and reducing the wedge angle γ defining the cutting edge at least in a longitudinal section extending directly up to the cutting edge, relative to the wedge angle γ at the remaining the cutting-edge segments.

In other words, the objects are achieved with the invention, in that the rake face, between a marginal section at the circumference of the drill bit and a section at the center of the drill bit, has one or more recesses which run right into the adjacent flank and which reduce the wedge angle γ, at least in a longitudinal section extending directly up to the cutting edge, relative to the remaining cutting-edge sections.

Due to the recesses in the rake face, a reduction in the wedge angle γ and thus a better drilling capacity of the drill bit are achieved. Owing to the fact that a rake-face section at the center and at the margin of the drill bit is designed without these recesses, the stability of the cutting edge is increased in these extremely sensitive zones. Thus the recesses in the sections lying in between can extend without a supporting chamfer up to the cutting edge and run into the adjacent flank, so that an extremely favorable chiseling action occurs as a result without having to fear chipping of the cutting edges. Since the rake-face section at the center of the drill bit has no recesses, and the recesses of the rake face in the adjoining region run right into the adjacent flank, the cutting-edge sections at the drill bit point stand out slightly from the adjacent cutting-edge sections and a good centering effect of the drill bit is achieved. Owing to the fact that the recesses are made in the rake face, a type of chip breaker groove is also obtained, which improves the disposal of the removed material and reduces the friction effect. As a result, the wear on the drill bit is markedly reduced. In addition, due to the virtually continuously very sharp cutting edges in this way, a very good cutting action is achieved even when cutting steel, and the chips running off due to the rotary movement are effectively deflected or discharged on account of the recesses.

It has proved to be especially successful if the wedge angle $\gamma_1$ reduced by the recesses lies within a range of between 50° and 70°, while the wedge angle $\gamma$ along the remaining cutting-edge sections lies within the range of between 80° and 100°.

For the optimum stability and resistance to chipping of the cutting edges, it has proved successful to design the cutting inserts in such a way that the length y of the marginal section at the circumference of the drill bit lies within a range of about 0.37 to 0.45 (37–45%) of the cutting-tip thickness, and the length x of the section at the center of the drill bit lies within a range of about 0.09 to 0.11 (9–11%) of the drill bit diameter.

In particular in the case of relatively large drill bit diameters, it is advantageous to provide not only one but also two or even more recesses between the center section and the marginal section in the cutting insert or cutting inserts of the drill bit. The length z of the rake-face sections having a large wedge angle $\gamma$ between the individual recesses is then to preferably lie within a range of about 0.07 to 0.13 (7–13%) of the cutting-tip thickness. Thus, optimum stability of the cutting edges is also obtained in the case of large drill bit diameters.

Furthermore, it has proved to be advantageous to design the recesses with a flat center region with rounded portions running out laterally and downward, the rake angle $\alpha$ in the flat center region of the recesses being about 90°.

It may also be advantageous for the disposal of the drillings or shavings to provide the recesses in such a way that they merge from the cutting insert right into the end section of the drill bit shank for accommodating the cutting insert and only run out there into the helical flutes for removing the drillings.

Especially good disposal of the removed drillings is made possible in this way.

If the drill bit is designed with a one-piece cutting insert having two front-end cutting edges running toward one another in a roof shape, it has proved successful to have the cutting edges run toward one another at a tip angle $\delta$ of about 130°.

Furthermore, it is advantageous if the two front-end cutting edges of the drill bit which run toward one another in a roof shape are each divided into two different sections, and if the respectively adjoining central cutting-edge sections enclose an tip angle $\delta_1$ of about 130° with one another, and the two circumferential cutting-edge sections enclose an tip angle $\delta_2$ of more than 130°, preferably 150°, with one another. This achieves the effect that the region of the cutting edge which is subjected to the greatest wear is specifically strengthened by additional material accumulation.

With the above and other objects in view there is also provided, in accordance with the invention, a cutting insert for a drill bit, in particular the above-summarized drill bit, comprising:

a cutting insert body formed with a rotary axis D and a periphery;

the cutting insert body being formed with at least one front-end cutting edge extending from the periphery to the rotary axis D;

a rake face formed on the cutting insert body ahead of the cutting edge in a direction of rotation of the cutting insert body, and a flank behind the cutting edge in the direction of rotation, the rake face and the flank face adjoining one another along the front-end cutting edge and enclosing a wedge angle $\gamma$ with one another;

the rake face having formed therein at least one recess between a marginal segment at the periphery and a center segment at a center of the cutting insert body, the recess reducing the wedge angle $\gamma$ defining the cutting edge, at least in a longitudinal section extending directly up to the cutting edge, relative to the wedge angle $\gamma$ at remaining the cutting-edge segments.

Other features which are considered as characteristic for the invention are set forth in the appended claims.

Although the invention is illustrated and described herein as embodied in a drill bit for drilling rock, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
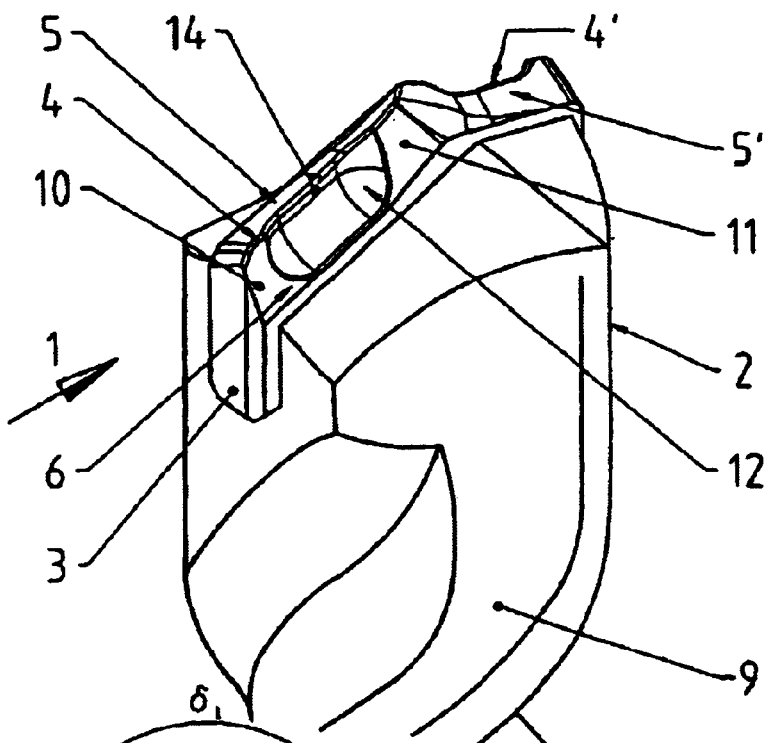
FIG. 1 is a perspective view of the drill bit head of a drill bit according to the invention.
Figure 2:
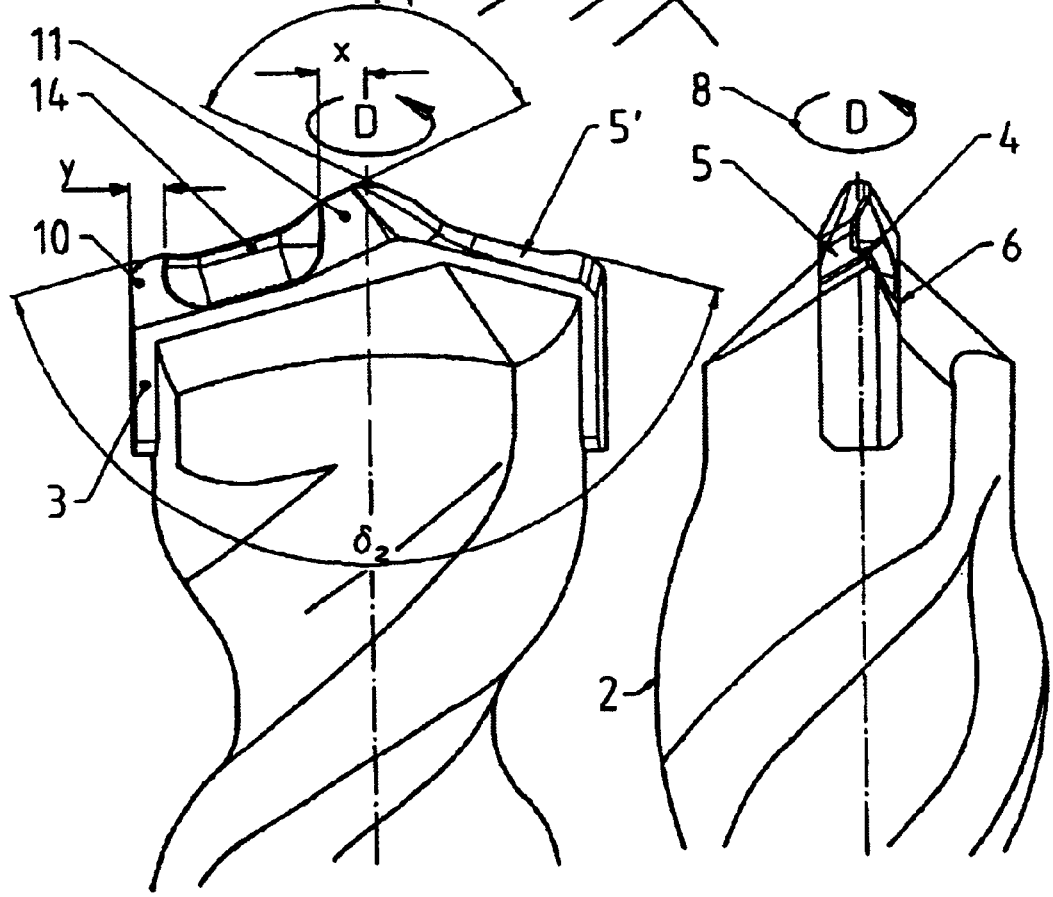
FIG. 2 shows the drill bit head according to FIG. 1 in a front view perpendicularly to the main cutting edges.
Figure 3:
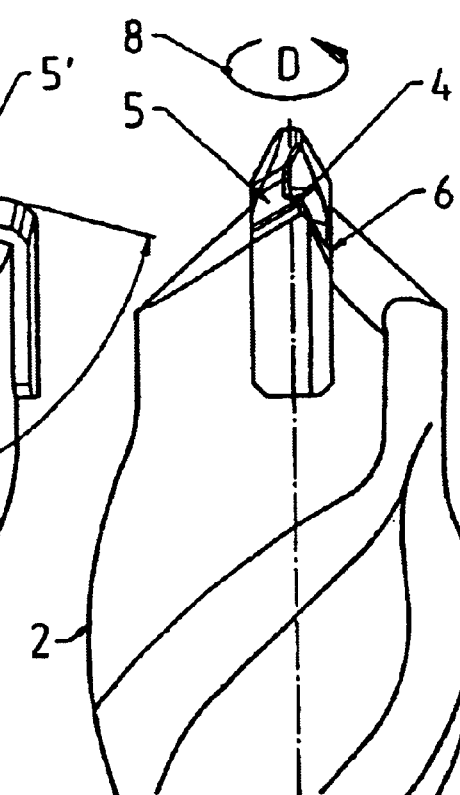
FIG. 3 shows the drill bit head according to FIG. 1 in a side view parallel to the main cutting edges.
Figure 4:
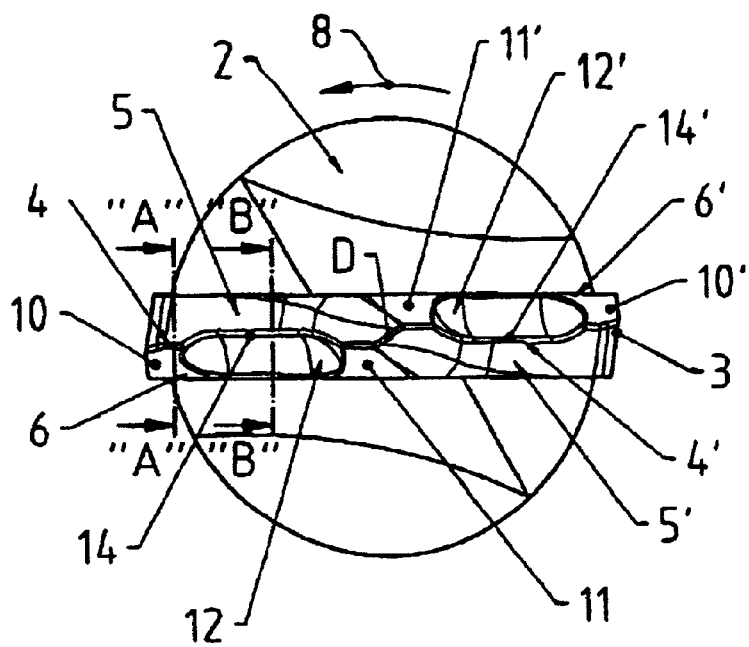
FIG. 4 shows the drill bit head according to FIG. 1 in a plan view of the front end.

Referring now to the figures of the drawing in detail and first, particularly, to FIGS. 1 to 3 thereof, there is shown a drill bit 1 according to the invention with an elongated shank 2 (only partly shown) with helically twisted flutes 9 for removing the drillings. The direction of rotation of the drill bit about the rotary axis D is indicated by an arrow 8. To form the drill bit head, the end of the shank 2 is provided with a slot transversely to the rotary axis D of the drill bit 1. A hard metal cutting insert 3 is brazed in place in the slot with slight circumferential projection.

Figure 5:
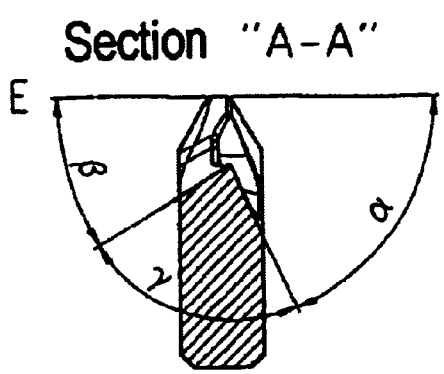
FIG. 5 shows the cutting insert according to FIG. 4 in a section taken along the section line V—V.
Figure 6:
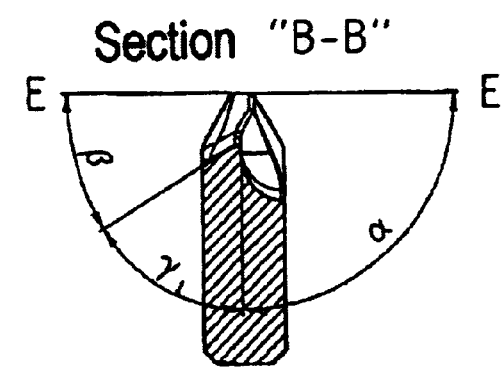
FIG. 6 shows the cutting insert according to FIG. 4 in a section taken along the section line VI—VI.

The cutting insert or cutting tip 3 has two cutting edges 4, 4' adjoining one another in a gabled roof shape, each cutting edge 4, 4' having two differently inclined sections. Those sections of the cutting edges 4, 4' which adjoin one another in the center of the drill bit 1 enclose a tip angle $\delta_1$ of 130° with one another, whereas the sections of the cutting edges 4, 4' at the circumference of the drill bit 1 enclose a tip angle $\delta_2$ of 150° with one another. The cutting edges 4, 4' are formed by the rake faces 6, 6' and the flanks 5, 5' adjoining one another at a wedge angle of $\gamma$. The rake faces 6, 6', with the exception of marginal sections 10, 10' at the circumference of the drill bit 1 and sections 11, 11' in the center of the drill bit 1, each have a recess 12, 12'. The wedge angle g in these marginal sections 10, 10' and sections 11, 11' at the center of the drill bit is 90°. The recesses 12, 12' run right into the adjacent flanks 5, 5' and each have a flat center section 14, 14' which runs out laterally and downward with rounded portions. The wedge angle γ of 90° present in the marginal regions 10, 10' and center sections 11, 11' is reduced by these recesses 12, 12' to a wedge angle γ of 60° in the center region 14, 14' of these recesses 12, 12'. The rake angle α in the center region 14, 14' is 90°. The corresponding angular ratios are clearly shown in FIGS. 5 and 6, which reproduce a section V—V through the cutting insert 3 in the marginal section 10 and a section VI—VI in the center of the recess 12.

Figure 7:
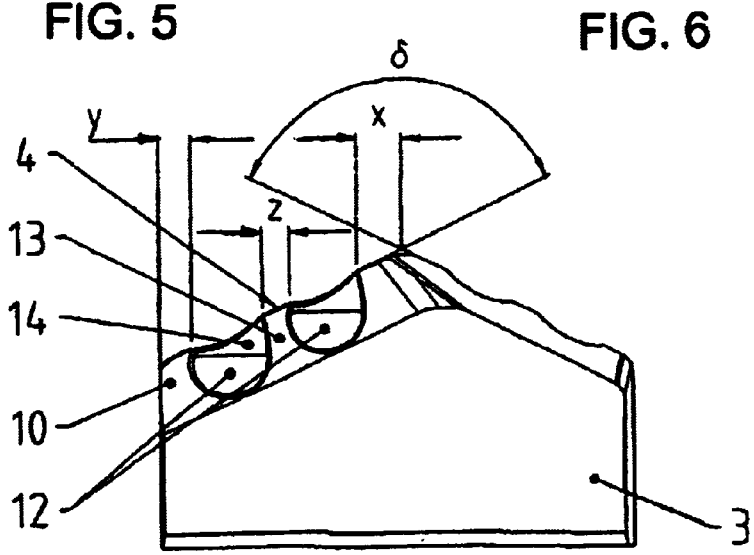
FIG. 7 shows a variant of a cutting insert for a drill bit according to the invention in a front view perpendicularly to the main cutting edges.

FIG. 7 shows a variant embodiment of a cutting insert for a drill bit 1 according to the invention. Here, each cutting edge 4, 4' in each case has two recesses 12, 12', which reduce the wedge angle γ. In addition, the cutting edges 4, 4' in this variant are not formed with two differently inclined sections and enclose a single tip angle δ of 130° with one another.

It will be understood by those of skill in the art that the figures represent only especially advantageous configurations of the invention. The invention is in no way restricted to the specific embodiments. In particular, the cutting insert may be split and not be of one-piece design, and a plurality of cutting inserts offset at an angle from one another may also be provided for forming the drill bit head.

I claim:

1. A drill bit, comprising:
    an elongated shank defining a rotary axis D of the drill bit and having at least one cutting insert at an end thereof;
    said cutting insert having at least one front-end cutting edge extending from a periphery to said rotary axis D of the drill bit, said cutting edge being formed by a rake face, lying ahead of said cutting edge in a direction of rotation of said drill bit, and a flank, lying behind said cutting edge in the direction of rotation of the drill bit, the rake face and the flank face adjoining one another and enclosing a wedge angle γ with one another;
    said rake face having formed therein at least one recess between a marginal segment at the periphery of the drill bit and a center segment at a center of the drill bit, said recess running into the adjacent said flank and reducing the wedge angle γ defining said cutting edge, at least in a longitudinal section extending directly up to the cutting edge, relative to the wedge angle γ at the remaining said cutting-edge segments.

2. The drill bit according to claim 1, wherein said cutting insert is configured for drilling rock.

3. The drill bit according to claim 1, wherein the wedge angle $γ_1$ adjoining said recesses and reduced by said recesses has a value in a range from 50° to 70°, and the wedge angle γ along the remaining said cutting-edge segments has a value in a range from 80° and 100°.

4. The drill bit according to claim 1, wherein the marginal segment at the periphery of the drill bit has a length within a range of about 37% to 45% of a cutting insert thickness, and the center segment at the center of the drill bit has a length within a range of about 9% to 11% of a drill bit diameter.

5. The drill bit according to claim 1, wherein said recess is one of a plurality of recesses, and a length of rake-to-face segments between the individual said recesses lies within a range of approximately 7% to 13% of a cutting insert thickness.

6. The drill bit according to claim 1, wherein said recess is formed with a flat center region having rounded portions running out laterally and downward, and a rake angle α in a center region of said recess is about 90°.

7. The drill bit according to claim 1, wherein said recess merges from said cutting insert right into an end section of said drill bit shank for accommodating said cutting insert.

8. The drill bit according to claim 1, wherein said cutting insert has two front-end cutting edges enclosing a tip angle δ of about 130° with one another.

9. The drill bit according to claim 1, wherein said cutting insert has two front-end cutting edges, each cutting edge is divided into two different segments, and the respectively adjoining central cutting-edge segments of said two front-end cutting edges enclose a tip angle $δ_1$ of about 130° with one another, and the two circumferential cutting-edge sections enclose a tip angle $δ_2$ of more than 130° with one another.

10. The drill bit according to claim 9, wherein said two circumferential cutting-edge sections enclose a tip angle $δ_2$ of more than 150° with one another.

11. A cutting insert for a drill bit, comprising:
    a cutting insert body formed with a rotary axis D and a periphery;
    said cutting insert body being formed with at least one front-end cutting edge extending from said periphery to said rotary axis D;
    a rake face formed on said cutting insert body ahead of said cutting edge in a direction of rotation of said cutting insert body, and a flank behind said cutting edge in the direction of rotation, said rake face and said flank face adjoining one another along said front-end cutting edge and enclosing a wedge angle γ with one another;
    said rake face having formed therein at least one recess between a marginal segment at said periphery and a center segment at a center of said cutting insert body, said recess reducing the wedge angle γ defining said cutting edge, at least in a longitudinal section extending directly up to the cutting edge, relative to the wedge angle γ at remaining said cutting-edge segments.

* * * * *